(12) United States Patent
Ballarino

(10) Patent No.: US 12,548,693 B2
(45) Date of Patent: Feb. 10, 2026

(54) CRYOGENIC LINK

(71) Applicant: CERN—EUROPEAN ORGANIZATION FOR NUCLEAR RESEARCH, Geneva (CH)

(72) Inventor: Amalia Ballarino, Geneva (CH)

(73) Assignee: CERN—EUROPEAN ORGANIZATION FOR NUCLEAR RESEARCH, Geneva (CH)

( * ) Notice: Subject to any disclaimer, the term of this patent is extended or adjusted under 35 U.S.C. 154(b) by 215 days.

(21) Appl. No.: 18/355,347

(22) Filed: Jul. 19, 2023

(65) Prior Publication Data

US 2025/0029751 A1    Jan. 23, 2025

(51) Int. Cl.
     *F17C 13/00*      (2006.01)
     *H01B 12/16*      (2006.01)

(52) U.S. Cl.
     CPC ........... *H01B 12/16* (2013.01); *F17C 13/007* (2013.01); *F17C 2203/0391* (2013.01); *F17C 2203/0685* (2013.01); *F17C 2203/0687* (2013.01); *F17C 2223/0161* (2013.01)

(58) Field of Classification Search
     CPC ........ Y02E 40/60; H01B 12/00; H01B 12/16; H02G 15/34; H02G 3/03
     See application file for complete search history.

(56) References Cited

U.S. PATENT DOCUMENTS

| | | | |
|---|---|---|---|
| 3,515,793 A | 6/1970 | Aupoix et al. | |
| 4,947,007 A * | 8/1990 | Dew | H02G 15/34 174/15.5 |
| 7,608,785 B2 * | 10/2009 | Reis | H01B 12/06 29/599 |
| 7,692,338 B2 * | 4/2010 | Yamaguchi | H02G 15/34 174/126.1 |
| 11,430,584 B2 * | 8/2022 | Arndt | H01B 12/02 |
| 2006/0211579 A1 * | 9/2006 | Yamaguchi | H01B 12/14 505/230 |

(Continued)

FOREIGN PATENT DOCUMENTS

| | | |
|---|---|---|
| CN | 208589306 U | 3/2019 |
| GB | 1284531 A | 8/1972 |
| JP | H09134624 A | 5/1997 |

OTHER PUBLICATIONS

Extended European Search Report for EP Application 24183381.3 dated Nov. 28, 2024, pp. 1-9.

(Continued)

*Primary Examiner* — Keith M Raymond
(74) *Attorney, Agent, or Firm* — Stoel Rives LLP

(57) ABSTRACT

There is provided a cryogenic link and a method of installing a cryogenic link. The cryogenic link comprises: a core and a cryostat. The cryostat comprises a flexible sleeve around the core and is configured to maintain a temperature of the core at a cryogenic temperature. The cryostat further comprises spacing means configured to maintain a spacing between the core and the flexible sleeve during expansion and contraction of the core. The flexible sleeve is suitable for fixing to an external structure at a plurality of fixed points, where each of the plurality of fixed points is separated by a distance, and a length of the cryogenic link between at least one pair of fixed points is greater than the distance between that pair of fixed points.

19 Claims, 7 Drawing Sheets

(56) References Cited

U.S. PATENT DOCUMENTS

| | | |
|---|---|---|
| 2008/0180202 A1 | 7/2008 | Otto et al. |
| 2008/0190646 A1* | 8/2008 | Folts ................ H02H 7/001 |
| | | 174/125.1 |
| 2010/0227764 A1 | 9/2010 | Willen et al. |
| 2010/0285968 A1 | 11/2010 | Gregory |
| 2013/0174584 A1* | 7/2013 | Stemmle ............... H01R 43/00 |
| | | 62/51.1 |
| 2014/0038827 A1* | 2/2014 | Stemmle .............. F16L 51/025 |
| | | 174/15.5 |
| 2019/0260194 A1 | 8/2019 | Stemmle et al. |
| 2020/0005968 A1 | 1/2020 | Van Der Laan |

OTHER PUBLICATIONS

Akhmetov, A., et al., "A theoretical investigation on current imbalance in fl at two-layer superconducting cables", ScienceDirect vol. 40, Issue 8-10 | https://doi.org/10.1016/S0011-2275(01)00020-0, 2000, pp. 627-635.

Bottura, L., et al., "Analysis of electrical coupling parameters in superconductingcables", ScienceDirect vol. 43, Issues 3-5 | https://doi.org/10.1016/S0011-2275(03)00040-7, 2003, pp. 233-239.

Ta, Wurui, et al., "Comparison study of cable geometries and superconductingtape layouts for high-temperature superconductor cables", ScienceDirect vol. 91 | https://www.sciencedirect.com/science/article/abs/pii/S0011227517304186, 2018, pp. 96-102.

"High-temperature superconductivity", retrieved from the Internet on Aug. 19, 2025, 22 pages, Wikipedia, https://en.wikipedia.org/wiki/High-temperature_superconductivity.

* cited by examiner

CRYOGENIC LINK

TECHNICAL FIELD

The invention relates to a cryogenic link and a method of installing a cryogenic link.

SUMMARY

Cryogenic links may be provided to transfer high current with reduced resistance. Cryogenic links may contract when their temperature is reduced to cryogenic temperature and may expand when their temperature is increased above the cryogenic temperature, placing additional demands on the cable design and installation.

At least some configurations of the present techniques comprise a cryogenic link comprising:
a core; and
a cryostat comprising a flexible sleeve around the core, the cryostat configured to maintain a temperature of the core at a cryogenic temperature, and spacing means configured to maintain a spacing between the core and the flexible sleeve during expansion and contraction of the core,
wherein:
the flexible sleeve is suitable for fixing to an external structure at a plurality of fixed points, each of the plurality of fixed points separated by a distance, and a length of the cryogenic link between at least one pair of fixed points is greater than the distance between that pair of fixed points.

At least some configurations of the present techniques comprise a method of installing a cryogenic link having a core, and a cryostat comprising a flexible sleeve around the core configured to maintain a temperature of the core at a cryogenic temperature, the cryostat comprising spacing means configured to maintain a spacing between the core and the flexible sleeve during expansion and contraction of the core,
the method comprising:
arranging the cryogenic link to run between a plurality of fixed points each of the plurality of fixed points separated by a distance, wherein a length of the cryogenic link between at least one pair of fixed points is greater than the distance between that pair of fixed points; and
fixing the flexible sleeve of the cryogenic link to each of the plurality of fixed points.

BRIEF DESCRIPTION OF THE DRAWINGS

The present techniques will be described further, by way of example only, with reference to configurations thereof as illustrated in the accompanying drawings, in which.

DETAILED DESCRIPTION

Figure 1:
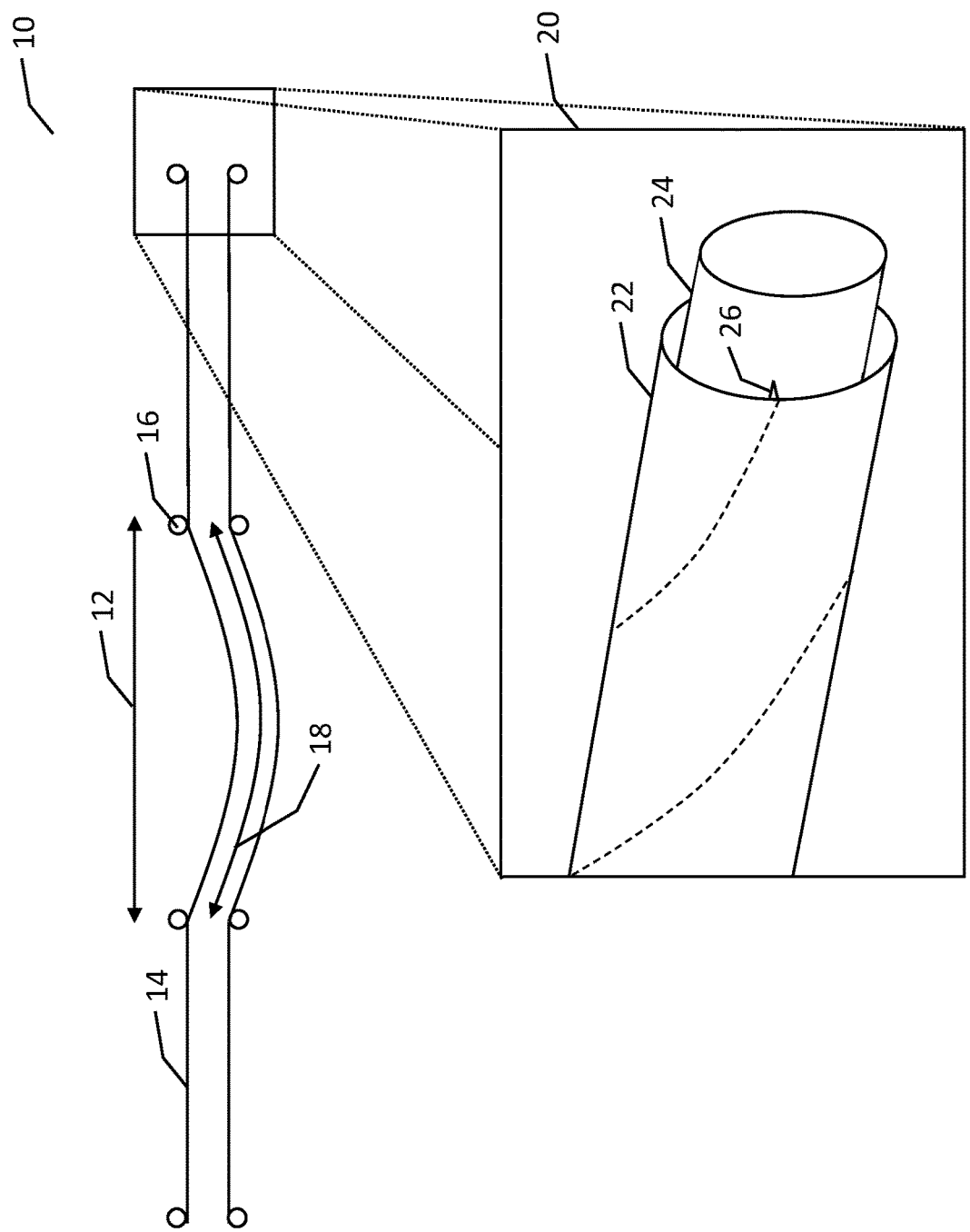
FIG. 1 schematically illustrates a cryogenic link according to some configurations of the present techniques.

At least some configurations provide a cryogenic link comprising: a core and a cryostat. The cryostat comprises a flexible sleeve around the core and is configured to maintain a temperature of the core at a cryogenic temperature. The cryostat further comprises spacing means configured to maintain a spacing between the core and the flexible sleeve during expansion and contraction of the core. The flexible sleeve is suitable for fixing to an external structure at a plurality of fixed points, where each of the plurality of fixed points is separated by a distance, and a length of the cryogenic link between at least one pair of fixed points is greater than the distance between that pair of fixed points.

The core of the cryogenic link is provided to transfer electrical current along the length of the core. The core is provided with a cryostat including a flexible sleeve which surrounds the core and, in some configurations, is capable of providing vacuum insulation that enables maintaining the core at cryogenic temperature. The commonly accepted definition of cryogenic temperature is any temperature below approximately minus 153 degrees Celsius (120 degrees Kelvin or minus 243 degrees Fahrenheit) and this definition will be adopted for the purpose of this application. Both the core and the flexible sleeve are considered to be flexible at cryogenic temperature. The environment in which the cryogenic link is deployed, referred to herein as the deployment environment, is typically room temperature but may be any temperature above cryogenic temperature. When operating in the deployment environment, the temperature of the deployment environment along the length of the cryogenic link may be fixed or may vary either in time and/or in space. Similarly (when in operation), the temperature of the core along the length of the cryogenic link may be fixed to any cryogenic temperature or may vary either in space and/or time.

The cryostat comprises a flexible sleeve (flexible sheath) that is positioned around the core (i.e., it surrounds the core in a radial direction) and maintains the vacuum insulation that enables the core to be at the cryogenic temperature independent of the temperature of the deployment environment. The flexible sleeve and the core are separated by spacing means which act to maintain a separation distance between the core and the flexible sleeve. The spacing means can be variously provided and, in some configurations, the spacing means comprises a continuous or discontinuous spiral structure that wraps (spirals) around the core. In other configurations, the spacing means is a fibrous or discontinuous structure that maintains a separation between the flexible sleeve and the core at discrete points both along the core and around the core. In some configurations the spacing means may be made of a flexible material.

The cryogenic link is of a type that is suitable for fixing to an external structure in such a manner that the length of the cryogenic link between at least one pair of fixed points is greater than the distance between that pair of fixed points. In other words, the cryogenic link is suitable for installation in such a manner that slack can be introduced between at least a subset of the fixed points (e.g. between two adjacent fixed points). The inventor has recognised that during operation, i.e., when parts of the cryogenic link are cooled to the cryogenic temperature (or when parts of the cryogenic link are allowed to warm up from the cryogenic temperature), the cryogenic link will contract (or expand) due to the change in temperature. This contraction/expansion includes the core and the cryostat, including flexible sleeve. The difference between the relative sizes and the coefficients of thermal expansion and contraction of the core and the cryostat could cause a relative reduction in space between the core and the flexible sleeve of the cryostat which may be detrimental to the operation of the cryogenic link and could potentially cause result in unwanted wear. The provision of spacing means enables the core and the cryostat to expand and contract together whilst maintaining the separation between the core and the flexible sleeve of the cryostat. Hence, a flexible cable can be provided that reduces wear on the cable during installation and operation of the cryogenic link.

The material out of which the core is made can take various forms, in some configurations the core comprises a superconducting material exhibiting a superconducting phase when cooled to below a critical temperature, and the cryogenic temperature is below the critical temperature. Unlike a typical conductor, in which a resistance of the material typically gradually (and continuously) decreases as the temperature is lowered, a superconducting material is one in which the resistance drops abruptly (i.e., discontinuously) to zero below a critical temperature. Superconducting materials held below the critical temperature are particularly advantageous for use in the cryogenic link as they allow large currents to be carried through the core in a compact volume and without encountering electrical resistance.

In some configurations the superconducting material comprises magnesium diboride. Magnesium diboride has a critical temperature of around 39 degrees Kelvin (minus 234 degrees Celsius or minus 389 degrees Fahrenheit). Magnesium diboride is a relatively low cost superconducting material resulting in a low cost implementation of the cryogenic link.

In some configurations the core comprises a conventional conductor operated at the cryogenic temperature. Whilst the electrical resistance provided by a conventional conductor at cryogenic temperatures is non-zero, in contrast to the case with a superconducting material operating below a critical temperature, a conventional conductor operating at cryogenic temperatures also provides a low resistance solution to transferring large currents without having to maintain a temperature below the critical temperature of the superconducting material. Hence, these embodiments provide an efficient cable for transferring current at low resistance and at lower cost.

In some configurations the flexible sleeve is an outer flexible sleeve and the cryostat comprises an inner flexible sleeve around the core; the outer flexible sleeve is arranged around the inner flexible sleeve and is separated from the inner flexible sleeve by the spacing means; and the cryostat is configured to maintain a vacuum insulation environment between the inner flexible sleeve and the outer flexible sleeve. The outer side of the outer flexible sleeve is exposed to the temperature of the deployment environment which, in some configurations, may be a room temperature environment. For the purpose of this disclosure, room temperature is considered to be any temperature greater than 0 degrees Celsius (273 degrees Kelvin or 32 degrees Fahrenheit). The spacing means maintains separation between the inner flexible sleeve and the outer flexible sleeve and provides structural integrity to the cryostat housing the vacuum insulation environment. In alternative configurations, and as described above, there is no inner flexible sleeve and, instead, the vacuum insulation environment is maintained between the flexible sleeve and the core.

In some configurations, the cryostat may also be provided with coolant which, for example, may be provided between the inner flexible sleeve and the core. It would be readily apparent to the skilled person that any type of coolant suitable for operation at the cryogenic temperature (or below the critical temperature in the case of a superconducting material) could be used.

In some configurations the cryogenic link is arranged to form a series of bends between each pair of fixed points. When the temperature of the cryogenic link is changed, for example, when the cable is being cooled prior to operation or when returning to room temperature once operation is ceased, both the cryostat and core will expand during heating/contract during cooling. If the cryogenic link is arranged in a straight line, or with substantially straight portions, then these portions may, when under contraction, exceed the critical stress/strain limits of the superconducting material. Arranging the cryogenic link to form the series of bends provides a geometry that allows the expanding cable to expand into a second geometrical dimension or take up slack from the second geometrical dimension and, thus, can accommodate the expansion or contraction of the cryogenic link without buckling or fracturing.

The series of bends can be provided in any shape. However, in some configurations and for at least a portion of the cryogenic link, the series of bends form a sinusoidal shape between each pair of fixed points. For the purpose of this disclosure, a sinusoidal shape is any shape that can be approximated as a smooth curve that is approximately periodic over the portion of the cryogenic link. The fixed points may be placed at any location relative to the sinusoidal shape. In some configurations the fixed points are placed at the turning points (maxima or minima) of the sinusoidal shape. Alternatively, the fixed points may be placed at points of highest gradient of the sinusoidal shape. The fixed points may be provided periodically, i.e., at every repetition of the sinusoidal shape. Alternatively, the fixed points may be spaced by more than one period of the sinusoidal shape. The sinusoidal shape provides a smooth and continuous curve having room for expansion and contraction at any point along its length.

The cryogenic link can be deployed in any manner within three dimensional space. However, in some configurations, between at least a subset of the plurality of fixed points, the cryogenic link is substantially arranged within a two dimensional plane. Arranging the cryogenic link in this way results in a more predictable behaviour during expansion and contraction which occurs as a result of heating and cooling of the cryogenic link.

In some configurations the two dimensional plane is orthogonal to a gravity direction. Arranging the two dimensional plane in this way results in a symmetric distribution of forces on different portions of the cable during expansion and contraction. In alternative configurations, the two dimensional plane may be aligned such that one of the axes defining the two dimensional plane is oriented in substantially the same direction as a gravity vector. Either configuration may be used dependent on the particular constraints of the deployment environment.

Whilst the spacing of the fixed points can be variously provided, in some configurations the fixed points are irregularly spaced along the length of the cryogenic link. In some configurations all the fixed points may be irregularly spaced, for example, to guide the cryogenic link around one or more obstacles. In alternative configurations, the fixed points may be regularly spaced over a portion of the cryogenic link with only a subset of the fixed points deviating from the regular spacing, for example, where the cryogenic link passes close to other equipment. Providing a cryogenic link that is suitable for deployment in an environment having irregularly spaced fixed points enables the cryogenic link to be deployed in a wide variety of different environments and configurations.

In some configurations the core is one of: a single core; and a plurality of cores electrically insulated from one another. Where a plurality of cores (cables) are provided, each of the plurality of cables may have different diameters and be capable of carrying different current loads. The plurality of cables may be grouped to form one or more bundles, for instance by twisting groups of the plurality of cables together and/or by wrapping electrically insulating or metallic material around the external surface of those groups.

In some configurations the core comprises a material that is flexible at any temperature. For example, the core may be flexible at both room temperature and at cryogenic temperature. In the present disclosure, a flexible material is one which can withstand bending and compression as a result of thermal expansion and contraction without breaking and that can subsequently be returned to its original shape.

In some configurations at least one end of the core is electrically coupled to a current lead, the current lead configured to transfer current between the core held at the cryogenic temperature and a termination at a temperature greater than 273 Kelvin. The core of the cryogenic link is held at a cryogenic temperature or, in some configurations, below a critical temperature for a superconducting material. Whilst such an arrangement facilitates efficient current transfer, there are additional challenges associated with feeding current into the core from electrical equipment operating at or near to room temperature, and/or removing current from the core and into electrical equipment. In addition, cabling pathways may become increasingly tortuous near the ends (terminations) of the cryogenic link requiring increased flexibility in the cables provided at those points. The current leads are arranged to transfer current from the core to a room temperature termination (greater than 273 degrees Kelvin). Typically, the current leads are provided as a small fraction of the total cable length relative to a length of the core. The provision of separate leads over this relatively small fraction of cable length allows for current leads integrating, for example, a more expensive superconducting material having appropriate properties to handle the more tortuous cable routing that may be required near to electrical equipment whilst maintaining operation at the cryogenic temperature. The provision of such current leads therefore increases the flexibility of implementation of the system whilst reducing the overall cost.

In some configurations the current lead comprises a superconducting material. Where the core also comprises a superconducting material, the current lead may be manufactured using either the same superconducting material as the core or a different superconducting material.

In some configurations the superconducting material is a high temperature superconducting material. A high temperature superconducting material is one which exhibits a superconducting phase at temperatures above 77 degrees Kelvin (minus 196.2 degrees Celsius, minus 321.1 degrees Fahrenheit).

In some configurations the superconducting material is a flexible high temperature superconducting material. The flexible high temperature superconducting material may be flexible at cryogenic temperature (for example, the critical temperature) and at room temperature.

In some configurations the superconducting material is one of: rare-earth barium copper oxide; bismuth strontium calcium copper oxide; magnesium diboride; niobium-titanium; and iron-based.

In some configurations the length of the cryogenic link between each pair of fixed points is greater than the distance between that pair of fixed points. In other words, for each pair of fixed points, the cryogenic link may be arranged such that there is slack between that pair of fixed points.

In some configurations at least one of the plurality of fixed points is configured to allow movement of the cryogenic link in any direction tangential to the cable direction. The cable direction is defined as a direction along which the cable travels. The cable may be described as having a radial axis and a longitudinal axis. At any point in space, the cable direction is the longitudinal axis of the cable at that point. The fixed points are therefore fixed in the sense that the cryogenic link is restricted such that it passes through that point in space. However, the point (position) along the cryogenic link that is located at the fixed point may change over time and as a result of heating/cooling of the cryogenic link. In other words, the at least one of the plurality of fixed points is configured to restrict movement of the cryogenic link in any direction orthogonal to the cable direction.

In some configurations there is provided a method of installing a cryogenic link. The cryogenic link having a core and a cryostat. The cryostat comprises a flexible sleeve around the core which is configured to maintain a temperature of the core at a cryogenic temperature. The cryostat also comprises spacing means configured to maintain a spacing between the core and the flexible sleeve during expansion and contraction of the core. The method comprises arranging the cryogenic link to run between a plurality of fixed points each of the plurality of fixed points separated by a distance, wherein a length of the cryogenic link between at least one pair of fixed points is greater than the distance between that pair of fixed points. The method also comprises fixing the flexible sleeve of the cryogenic link to each of the plurality of fixed points. The method of installing the cryogenic link may be applied to any cryogenic link described above. In some configurations, the method may further comprise arranging the fixed points such that the fixed points are irregularly spaced with a greater number of fixed points being provided at locations where movement of the cryogenic link is less desirable, for example, near to other electrical equipment. In some configurations, the cryostat comprises a flexible sleeve around the core which is configured to maintain the vacuum insulation that ensures a temperature of the core at a cryogenic temperature.

Particular configurations of the invention will now be described with reference to the accompanying figures.

FIG. 1 schematically illustrates a cryogenic link 14 according to various configurations of the present techniques. The cryogenic link 14 (as illustrated in detail in the zoomed portion 20) comprises a core 24 and a cryostat comprising an outer sleeve 22 and spacing means 26. The core 24 is formed from an electrically conductive material which, in some configurations, is a superconductive material exhibiting a superconductive phase when cooled below a critical temperature associated with the superconductive material. The sleeve 22 surrounds the core 24 and in combination with the core 24, maintains an air tight region between the core 24 and the sleeve 22 which is maintained as a vacuum environment by the cryostat. Spacing between the core 24 and the sleeve 22 is maintained by the spacing means 26 which, in the illustrated configurations, is of the form of one or more spiral structures that continuously winds around the core.

The cryogenic link 14 including the core 24, the sleeve 22, and the spacing means 26, is flexible at both the temperature of the deployment environment 10 and at cryogenic temperatures. Where the core 24 is composed of a superconducting material, the cryogenic link 10 is also flexible below the critical temperature of the superconducting material. In use, the cryogenic link 14 is deployed between a series of fixed points, for example, the fixed point 16 in such a way that the length 18 of the cryogenic link 14 between a pair of fixed points is greater than a distance 12 between that pair of fixed points.

Figure 2:
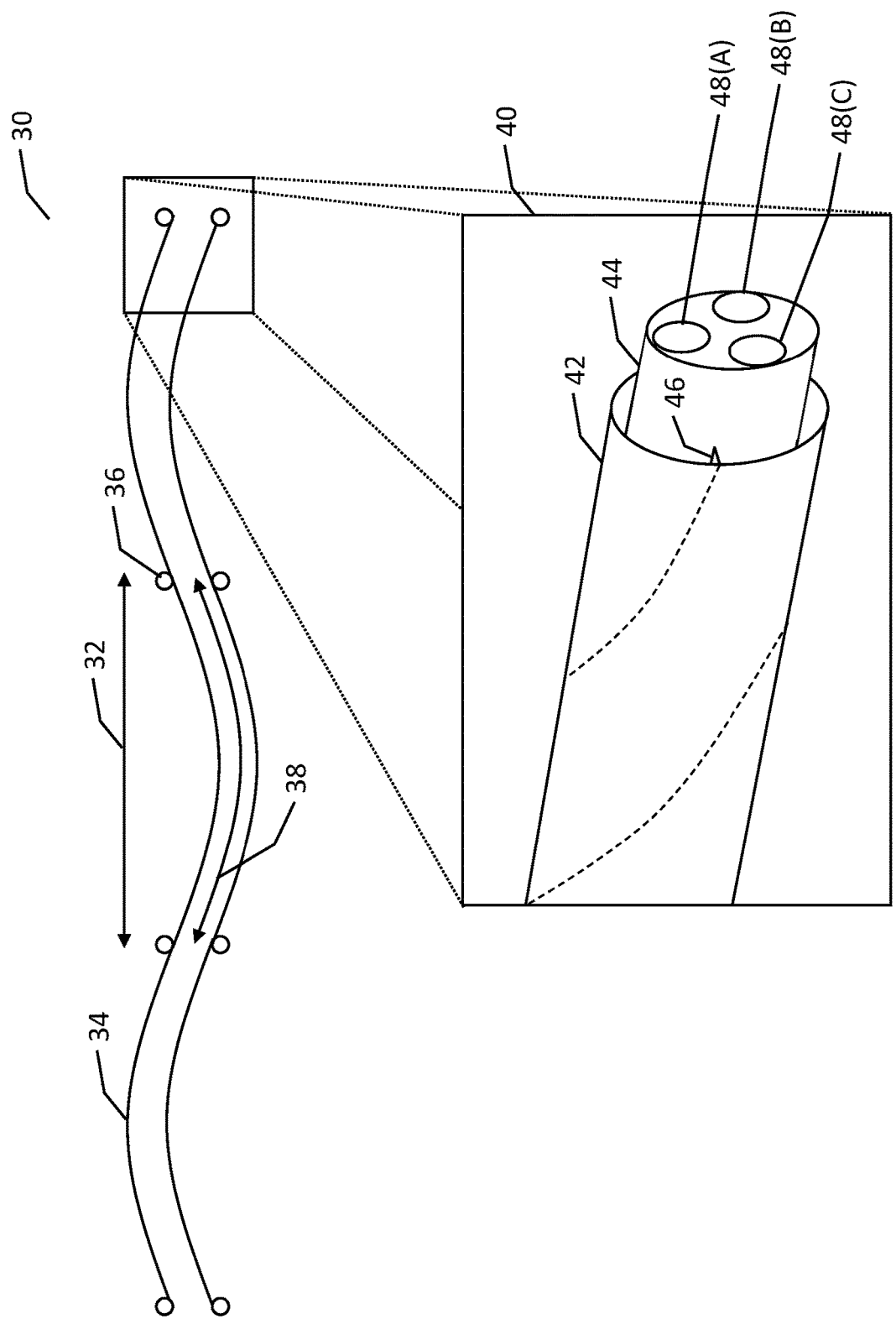
FIG. 2 schematically illustrates a cryogenic link according to some configurations of the present techniques.

FIG. 2 schematically illustrates a further example of a cryogenic link 34 according to various configurations of the present techniques. The cryogenic link 34 (as illustrated in the zoomed portion 40) comprises a plurality of cores 48(A), 48(B), and 48(C) surrounded by electrical insulation 44, and a cryostat comprising a sleeve 42 separated from the cores 48 by spacing means 46. The sleeve 42, in combination with the cores 48 and insulation 44 form an air tight chamber capable of housing a vacuum environment. The spacing means 46 is provided between the sleeve 42 and the cores 48 and, in the illustrated configuration, takes the form of one or more spiral structures that continuously winds around the core.

As in the case of FIG. 1, the cryogenic link 34 including the core 44, the sleeve 42, and the spacing means 46 are composed of flexible materials that are flexible at both operation temperature (cryogenic temperature and/or below the critical temperature where the cores 44 are composed of a superconducting material) and at the temperature of the deployment environment 30. The cryogenic link 34 is suitable for deployment between a series of fixed points, for example, the fixed point 36 in such a way that the length 38 of the cryogenic link 34 between a pair of fixed points is greater than a distance 32 between that pair of fixed points. In the illustrated configuration, the cryogenic link 34 forms a series of curves between each pair of fixed points, the series of curves taking the form of a sinusoid.

It would be readily apparent to the skilled person that the cores 48 of the cryogenic link 34 may each be composed of a same material or of different materials. Furthermore, any number of cores may be provided wand the cores may be of different thickness from one another.

Figure 3:
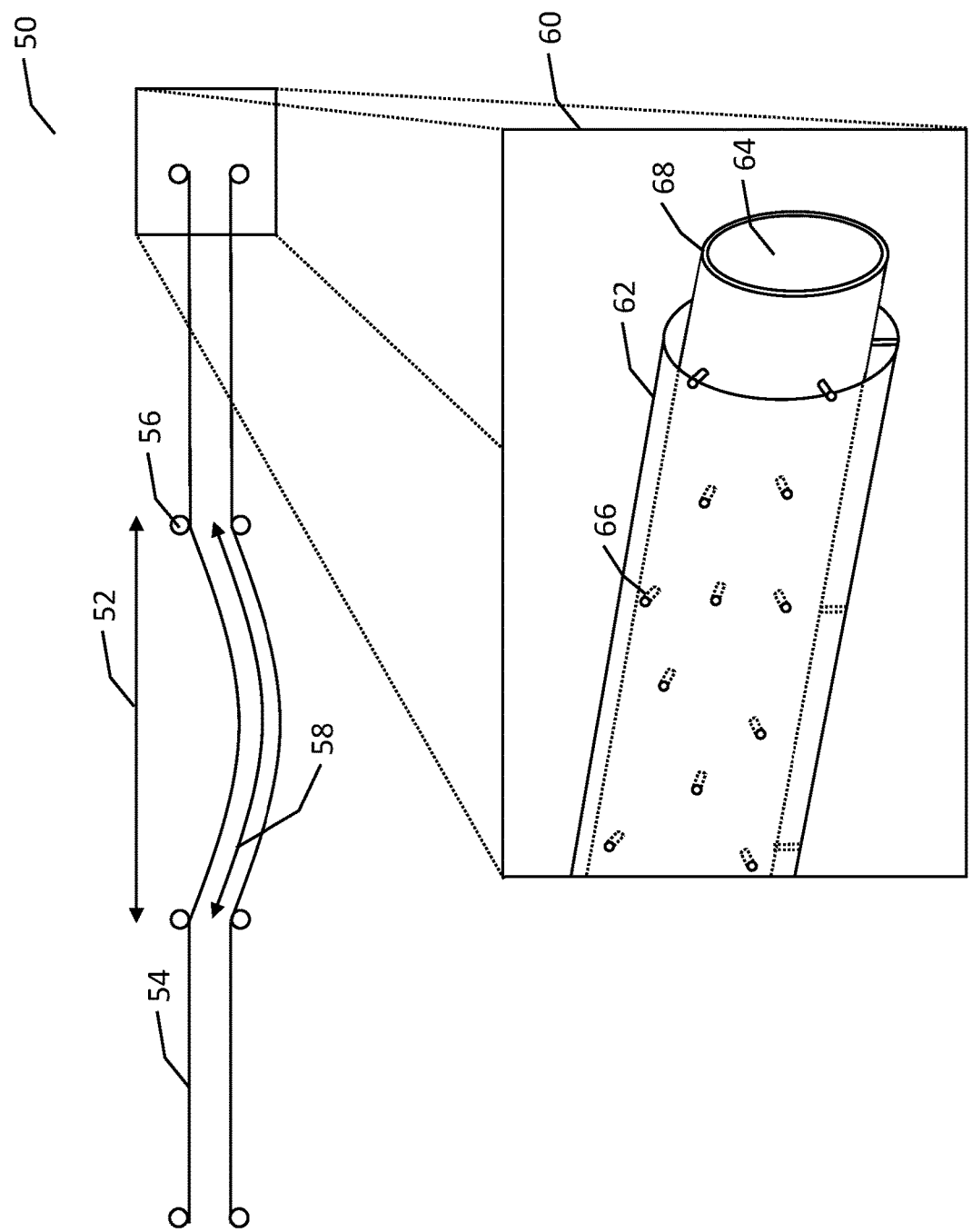
FIG. 3 schematically illustrates a cryogenic link according to some configurations of the present techniques.

FIG. 3 schematically illustrates a further example of a cryogenic link 54 according to various configurations of the present techniques. The cryogenic link 54 (as illustrated in the zoomed portion 60) comprises a core 64 and a cryostat comprising an outer sleeve 62 and an inner sleeve 68 separated by spacing means 66. The outer sleeve 62 and the inner sleeve 68 form a vacuum tight chamber capable of housing a vacuum environment. The inner sleeve 68 is provided around the core 64 and may also provide electrical insulation for the core 64. The spacing means 66 is provided between the inner sleeve 68 and the outer sleeve 62 and, in the illustrated configuration, takes the form of a fibrous structure comprising a series of individual spacing elements separated from one another along the length of the cryogenic link.

As in the case of FIG. 1, the cryogenic link 54 including the core 64, the inner sleeve 68, the outer sleeve 62, and the spacing means 66 are composed of flexible materials that are flexible at both operation temperature (cryogenic temperature and/or below the critical temperature where the core 64 is composed of a superconducting material) and at the temperature of the deployment environment 50. The cryogenic link is suitable for deployment between a series of fixed points, for example, the fixed point 56 in such a way that the length 58 of the cryogenic link 54 between a pair of fixed points is greater than a distance 52 between that pair of fixed points.

Figure 4:
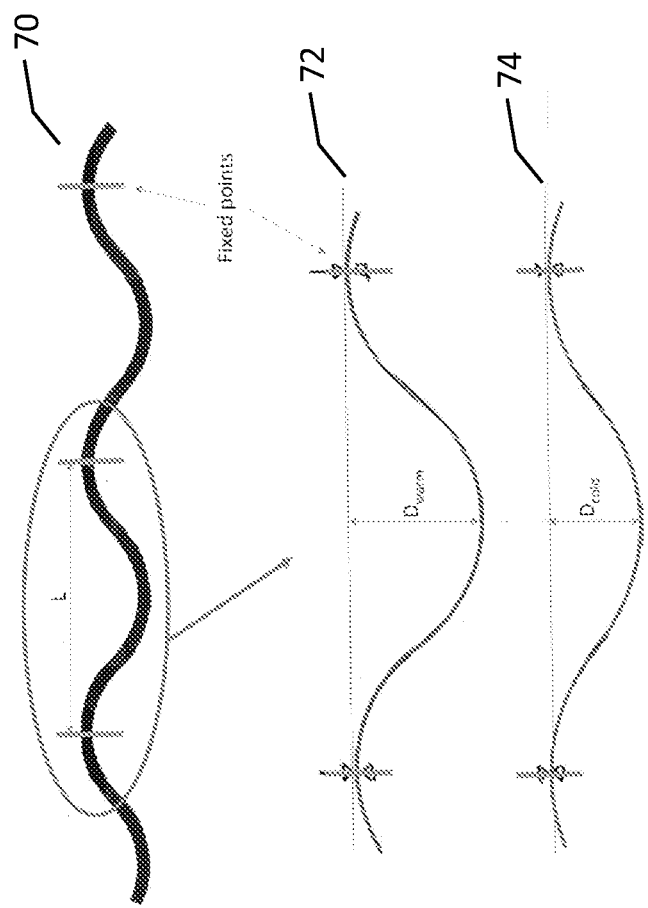
FIG. 4 schematically illustrates a cryogenic link fixed to an external structure at a plurality of fixed points according to some configurations of the present techniques.

FIG. 4 schematically illustrates a cryogenic link deployed in a deployment environment 70 in both a "warm" configuration 72 and a "cold" configuration 74. The cryogenic link is arranged (deployed) having a sinusoidal shape with fixed points being provided at each period of the sinusoidal shape. The deployment of the cryogenic link in the sinusoidal shape provides slack that is taken up by the cryogenic link under cooling and provides additional room for the cryogenic link to expand into under heating. The middle portion 72 of FIG. 4 schematically illustrates one period of the cryogenic link in a warm configuration. The cryogenic link arranged in a sinusoidal shape deviates from a straight line by an amount $D_{warm}$. For a cryogenic link arranged in a shape approximated by the mathematical expression $$A \sin\left(\frac{2\pi x}{\Lambda}\right),$$

where $\Lambda$ is the period of the sinusoidal shape and the distance between the fixed points and A is the amplitude, the straight line deviation $D_{warm}$ is equal to 2A. The lower portion 74 of FIG. 4 schematically illustrates the same cryogenic link once it has been cooled to cryogenic temperatures. At cryogenic temperature, the cryogenic link contracts such that the deviation of the sinusoidal shape from the straight line is equal to $0 < D_{cold} < D_{warm}$. Sufficient slack is provided in the sinusoidal configuration such that the sinusoidal shape is retained at the cryogenic temperature such that, when the cryogenic link is heated back to room temperature, the cable is pre-bent providing and not restricted to a one dimensional shape. As a result, the expansion due to heating causes the cable to expand in the two dimensional space in which the sinusoidal shape is defined without buckling (as would be the case if the cryogenic link were to be restricted to a straight line when in the cold configuration).

Figure 5:
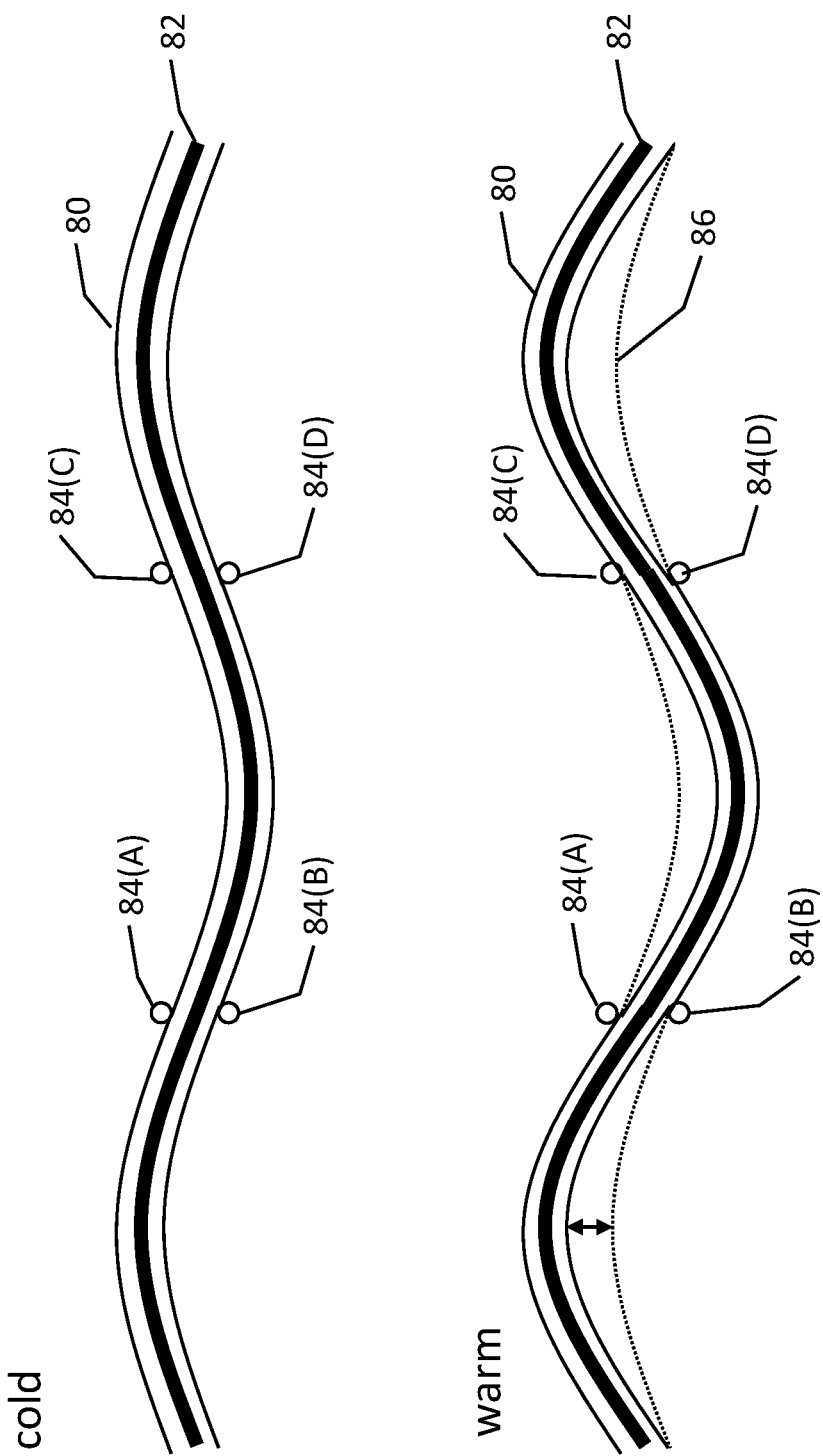
FIG. 5 schematically illustrates a cryogenic link in a cold configuration and in a warm configuration according to some configurations of the present techniques.

FIG. 5 schematically illustrates further details of the cryogenic link moving from the warm configuration to the cold configuration. The cold configuration is illustrated in the upper portion of FIG. 5 and the warm configuration is illustrated in the lower portion of FIG. 5. Considering first the cold configuration, the cryogenic link comprises a core 82 and a flexible sleeve 80 which is separated from the core 82 by spacing means (not illustrated). The cryogenic link is arranged between a plurality of fixed points 84 including a first pair of fixed points 84(A), 84(B) and a second pair of fixed points 84(C), 84(D). The cryogenic link including both the core 82 and the flexible sleeve 80 are arranged in a sinusoidal manner with the spacing means acting to maintain a suitable spacing between the core 82 and the flexible sleeve 84 over the length of the cryogenic link. As the cryogenic link is warmed to the warm configuration, the cryogenic link including the core 82 and the flexible sleeve 84 expand to take the shape illustrated in the warm configuration. In the warm configuration, the cold position of the cryogenic link is illustrated using the dotted line 86. Both the core 82 and the flexible sleeve 80 have expanded forming a sinusoidal shape having greater amplitude. The spacing means (not illustrated) maintains the spacing between the core 82 and the cladding 80 such that the core 82 remains substantially in the centre of the cladding 80 as the cryogenic link transitions from the warm configuration to the cold configuration. The bends provided by the cryogenic link (in this case illustrated as a sinusoidal configuration) provide the necessary slack such that is not stretched when moving from the warm configuration to the cold configuration and is able to expand into the two dimensional plane in which the cable is arranged when moving from the cold configuration to the warm configuration reducing the chance that the cable will buckle.

It is emphasised that the cold and warm configurations described in relation to FIGS. 4 and 5 are described in relative terms with the warm configuration being warmer than the cold configuration. It would be readily apparent to the skilled person that the principles described in relation to these figures are not reliant on any particular "cold" or "warm" temperature, but are intended to describe the relative expansion and contraction of the cryogenic link as it moves from a relatively warm to a relatively cold state.

Figure 6:
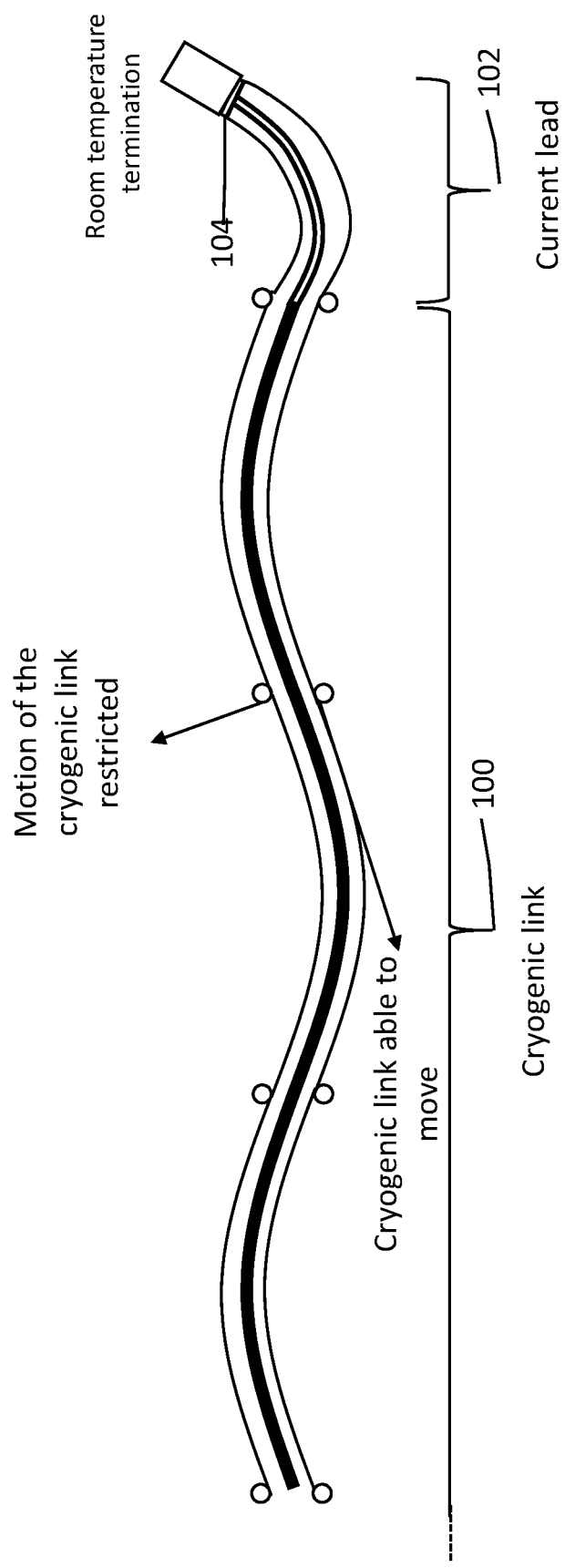
FIG. 6 schematically illustrates a cryogenic link and a current lead according to some configurations of the present techniques.

FIG. 6 schematically illustrates a cryogenic link 100 coupled (connected) to a current lead 104 at one end of the cryogenic link. The current lead 102 is provided to transfer current from the cryogenic environment of the core of the cryogenic link to a room temperature termination 104. The current lead covers a shorter distance than the cryogenic link and may be made of a more expensive and more flexible material than the cryogenic link. As a result, the current lead can be used to connect electrical equipment to the cryogenic link and may take a more tortuous pathway than the cryogenic link, for example, as necessitated by the positioning and design of the electrical equipment. In the illustrated configuration, the current lead is provided with a vacuum environment that is common with the cryogenic link. In alternative configurations (not illustrated), the current lead may be provided with its own vacuum environment distinct from the vacuum environment of the cryogenic link. The cryogenic link 100 is arranged between a plurality of fixed points, which act to restrict the movement of the cryogenic link in the direction tangential to the cable direction. The cryogenic link is able to move in a direction parallel to the longitudinal axis of the cable through the fixed points. For example, the cryogenic link may be able to slide through the fixed points. This approach provides additional freedom of movement to the cryogenic link reducing the likelihood that the cable will stretch or buckle during heating and/or cooling.

Figure 7:
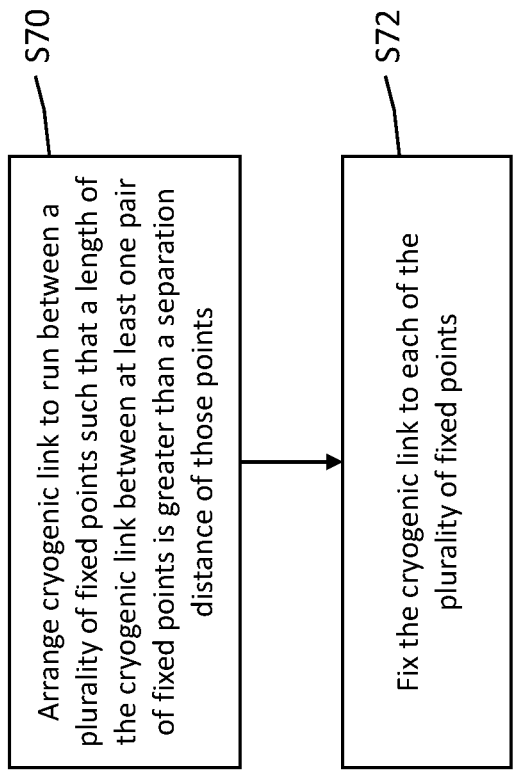
FIG. 7 schematically illustrates a sequence of steps according to some configurations of the present techniques.

FIG. 7 schematically illustrates a sequence of steps taken to deploy the cryogenic link in a deployment environment. Flow begins at step S70 where a cryogenic link, for example, the cryogenic link as described in relation to FIGS. 1 to 6, is arranged to run between a plurality of fixed points. The cryogenic link is arranged such that a length of the cryogenic link between at least one pair of the fixed points is greater than a separation distance between those points. In some alternative configurations, the cryogenic link is arranged such that a length of the cryogenic link between each pair of fixed points is greater than a separation distance between those points. The fixed points may be provided as regularly spaced or irregularly spaced fixed points, for example, a greater density of fixed points may be provided at positions along the cable where the cable takes a more tortuous path.

Flow then proceeds to step S72 where the cryogenic link is fixed to each of the plurality of fixed points. In some configurations, the cryogenic link is fixed such that the cryogenic link can move, relative to each pair of fixed points, in a direction parallel to a longitudinal axis of the cryogenic link but is restricted from moving in a direction tangential to the longitudinal axis of the cryogenic link.

In brief overall summary there is provided a cryogenic link and a method of installing a cryogenic link. The cryogenic link comprises: a core and a cryostat. The cryostat comprises a flexible sleeve around the core and is configured to maintain a temperature of the core at a cryogenic temperature. The cryostat further comprises spacing means configured to maintain a spacing between the core and the flexible sleeve during expansion and contraction of the core. The flexible sleeve is suitable for fixing to an external structure at a plurality of fixed points, where each of the plurality of fixed points is separated by a distance, and a length of the cryogenic link between at least one pair of fixed points is greater than the distance between that pair of fixed points.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations have been described in detail herein with reference to the accompanying drawings, it is to be understood that the invention is not limited to those precise configurations, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

What is claimed is:
1. A cryogenic link comprising:
a core; and
a cryostat comprising a flexible sleeve around the core, the cryostat configured to maintain a temperature of the core at a cryogenic temperature, and spacing means configured to maintain a spacing between the core and the flexible sleeve during expansion and contraction of the core,
wherein:
the flexible sleeve is suitable for fixing to an external structure at a plurality of fixed points, each of the plurality of fixed points separated by a distance, and a length of the cryogenic link between at least one pair of fixed points is greater than the distance between that pair of fixed points, and
wherein at least one of the plurality of fixed points is configured to allow movement of the cryogenic link in any direction tangential to the cable direction at the at least one of the plurality of fixed points.

2. The cryogenic link of claim 1, wherein the core comprises a superconducting material exhibiting a superconducting phase when cooled to below a critical temperature, and the cryogenic temperature is below the critical temperature.

3. The cryogenic link of claim 2, wherein the superconducting material comprises magnesium diboride.

4. The cryogenic link of claim 1, wherein the core comprises a non-superconductive material operated at the cryogenic temperature.

5. The cryogenic link of claim 1, wherein:
the flexible sleeve is a00400n outer flexible sleeve and the cryostat comprises an inner flexible sleeve around the core;
the outer flexible sleeve is arranged around the inner flexible sleeve and is separated from the inner flexible sleeve by the spacing means; and
the cryostat is configured to maintain a vacuum insulation environment between the inner flexible sleeve and the outer flexible sleeve.

6. The cryogenic link of claim 1, wherein the cryogenic link is arranged to form a series of bends between each pair of fixed points.

7. The cryogenic link of claim 6, wherein, for at least a portion of the cryogenic link, the series of bends form a sinusoidal shape between each pair of fixed points.

8. The cryogenic link of claim 1, wherein between at least a subset of the plurality of fixed points, the cryogenic link is substantially arranged within a two dimensional plane.

9. The cryogenic link of claim 8, wherein the two dimensional plane is orthogonal to a gravity direction.

10. The cryogenic link of claim 1, wherein the fixed points are irregularly spaced along the length of the cryogenic link.

11. The cryogenic link of claim 1, wherein the core is one of:
a single core; and
a plurality of cores electrically insulated from one another.

12. The cryogenic link of claim 1, wherein the core comprises a material that is flexible at a temperature above cryogenic temperature.

13. The cryogenic link of claim 1, wherein at least one end of the core is electrically coupled to a current lead, the current lead configured to transfer current between the core held at the cryogenic temperature and a termination at a temperature greater than 273 Kelvin.

14. The cryogenic link of claim 13, wherein the current lead comprises a superconducting material.

15. The cryogenic link of claim 14, wherein the superconducting material is a high temperature superconducting material.

16. The cryogenic link of claim 14, wherein the superconducting material is a flexible high temperature superconducting material.

17. The cryogenic link of claim 14, wherein the superconducting material is one of:
rare-earth barium copper oxide;
bismuth strontium calcium copper oxide;
magnesium diboride;
niobium-titanium; and
iron-based.

18. The cryogenic link of claim 1, wherein the length of the cryogenic link between each pair of fixed points is greater than the distance between that pair of fixed points.

19. A method of installing a cryogenic link having a core, and a cryostat comprising a flexible sleeve around the core configured to maintain a temperature of the core at a cryogenic temperature, the cryostat comprising spacing means configured to maintain a spacing between the core and the flexible sleeve during expansion and contraction of the core,
the method comprising:
arranging the cryogenic link to run between a plurality of fixed points each of the plurality of fixed points separated by a distance, wherein a length of the cryogenic link between at least one pair of fixed points is greater than the distance between that pair of fixed points, and wherein at least one of the plurality of fixed points is configured to allow movement of the cryogenic link in any direction tangential to the cable direction at the at least one of the plurality of fixed points; and
fixing the flexible sleeve of the cryogenic link to each of the plurality of fixed points.

* * * * *